US012531321B2

(12) United States Patent
Wang et al.

(10) Patent No.: US 12,531,321 B2
(45) Date of Patent: Jan. 20, 2026

(54) CAVITY FILTER

(71) Applicant: Suzhou Luxshare Technology Co., Ltd., Suzhou (CN)

(72) Inventors: Wei Wang, Suzhou (CN); Xinghua Sun, Suzhou (CN)

(73) Assignee: SUZHOU LUXSHARE TECHNOLOGY CO., LTD., Suzhou (CN)

( * ) Notice: Subject to any disclaimer, the term of this patent is extended or adjusted under 35 U.S.C. 154(b) by 153 days.

(21) Appl. No.: 18/239,950

(22) Filed: Aug. 30, 2023

(65) Prior Publication Data

US 2024/0120631 A1 Apr. 11, 2024

(30) Foreign Application Priority Data

Oct. 11, 2022 (CN) ......................... 202211242994.9

(51) Int. Cl.
*H01P 1/208* (2006.01)
*H01P 1/207* (2006.01)
*H01P 7/06* (2006.01)

(52) U.S. Cl.
CPC .............. *H01P 1/208* (2013.01); *H01P 1/207* (2013.01); *H01P 7/06* (2013.01)

(58) Field of Classification Search
CPC ............. H01P 1/208; H01P 7/06; H01P 1/207
USPC .................................................. 333/208–212
See application file for complete search history.

(56) References Cited

U.S. PATENT DOCUMENTS

2011/0241801 A1 10/2011 Subedi
2012/0326806 A1 12/2012 Nummerdor
2022/0006169 A1* 1/2022 Capdevila Cascante .................... H01P 11/007

FOREIGN PATENT DOCUMENTS

| | | | |
|---|---|---|---|
| CN | 106356595 | A | 1/2017 |
| CN | 108933311 | A | 12/2018 |
| CN | 111584981 | A | 8/2020 |
| CN | 214672910 | U | 11/2021 |
| CN | 214957291 | U | 11/2021 |
| CN | 215732126 | U | 2/2022 |
| CN | 113113743 | B | 6/2022 |

* cited by examiner

*Primary Examiner* — Rakesh B Patel

(74) *Attorney, Agent, or Firm* — Birch, Stewart, Kolasch & Birch, LLP

(57) ABSTRACT

The embodiments of the present disclosure disclose a cavity filter. An inner wall of a resonant cavity is provided with a plurality of non-coplanar extension sections inclined toward an outer wall; and meanwhile, each extension section gradually extends toward an end cover from a bottom shell. Thus, a volume of the resonant cavity is increased, making an insertion loss smaller; an outer dimension of the cavity filter is further reduced, making an overall weight lighter; and meanwhile, during casting of a shell portion of the cavity filter, the difficulty of demolding is reduced.

10 Claims, 4 Drawing Sheets

Prior Art

CAVITY FILTER

CLAIM OF PRIORITY AND CROSS-REFERENCE TO RELATED APPLICATION(S)

This application claims the benefit of Chinese Patent Application No. 202211242994.9, filed on Oct. 11, 2022, which is incorporated herein by reference in its entirety.

BACKGROUND OF THE INVENTION

1. Field of the Invention

The present invention relates to the technical field of filters, and in particular to a cavity filter.

2. Description of the Related Art

The filtering performance may be directly affected by a shape of a resonant cavity of a cavity filter. Therefore, there is a need for setting parameters such as a depth and a volume of the resonant cavity. That is, there is a need for ensuring that the resonant cavity has a certain depth and volume. However, it also brings some difficulties to manufacturing of the cavity filter. Therefore, how to meet the needs of a manufacturing process has become a problem to be solved.

BRIEF DESCRIPTION OF THE INVENTION

In view of this, the embodiments of the present disclosure provide a cavity filter, which optimizes a structure of a resonant cavity using a plurality of extension sections distributed on an inner wall, thereby improving the filtering performance of the cavity filter.

The cavity filter of the embodiments of the present disclosure includes:

- a shell portion, including a side shell, an end cover and a bottom shell, where the end cover and the bottom shell are arranged oppositely, and the side shell extends from the bottom shell to the end cover to form a resonant cavity;
- the resonant cavity is provided with an inner wall arranged on the side shell, the side shell is provided with an outer wall away from the inner wall, and the inner wall is provided with a plurality of extension sections in an extension direction of the side shell; and
- one sides, away from the bottom shell, of the plurality of extension sections which are non-coplanar are inclined toward the outer wall on a radial cross section of the shell portion.

Further, the cavity filter further includes:

- a mounting boss, protruding from the bottom shell and having a mesa spaced from the end cover by a predetermined distance.

Further, the bottom shell has an annular plane, and the annular plane is located between the side shell and the mounting boss.

Further, an inclination angle of each extension section is larger than 0 degree and smaller than 5 degrees.

Further, the plurality of extension sections include a first extension section, a second extension section, a third extension section, and a fourth extension section which are connected with each other sequentially; the first extension section is adjacent to the bottom shell; and the fourth extension section is adjacent to the end cover.

Further, the inclination angles of the first extension section, the second extension section, the third extension section, and the fourth extension section are sequentially reduced.

Further, the inclination angle of the first extension section is larger than 3.5 degrees and smaller than or equal to 5 degrees; the inclination angle of the second extension section is larger than 2 degrees and smaller than or equal to 3.5 degrees; the inclination angle of the third extension section is larger than 1.2 degrees and smaller than or equal to 2 degrees; and the inclination angle of the fourth extension section is larger than 0 degree and smaller than or equal to 1.2 degrees.

Further, lengths of the first extension section, the second extension section and the third extension section in the extension direction of the side shell are a first section length, a second section length and a third section length respectively; and

- the first section length, the second section length and the third section length are configured to be positively correlated with the inclination angles of the corresponding extension sections.

Further, the shell portion further includes a fillet; and the fillet faces the resonant cavity and is located at a connecting position of the side shell and the bottom shell.

Further, a distance from the extension section, close to the bottom shell, to a center of the shell portion is less than that from the extension section, far away from the bottom shell, to the center of the shell portion.

For the cavity filter of the embodiments of the present disclosure, the inner wall of the resonant cavity is provided with the plurality of non-coplanar extension sections inclined toward the outer wall; and meanwhile, each extension section gradually extends toward the end cover from the bottom shell. Thus, a volume of the resonant cavity is increased, making an insertion loss smaller; an outer dimension of the cavity filter is further reduced, making an overall weight lighter; and meanwhile, during casting of a shell portion of the cavity filter, the difficulty of demolding is reduced.

BRIEF DESCRIPTION OF THE DRAWINGS

The foregoing and other objectives, features and advantages of the present disclosure will become more apparent from the following description of embodiments of the present disclosure with reference to the accompanying drawings, in which.

DETAILED DESCRIPTION OF EMBODIMENTS OF THE INVENTION

Figure 1:
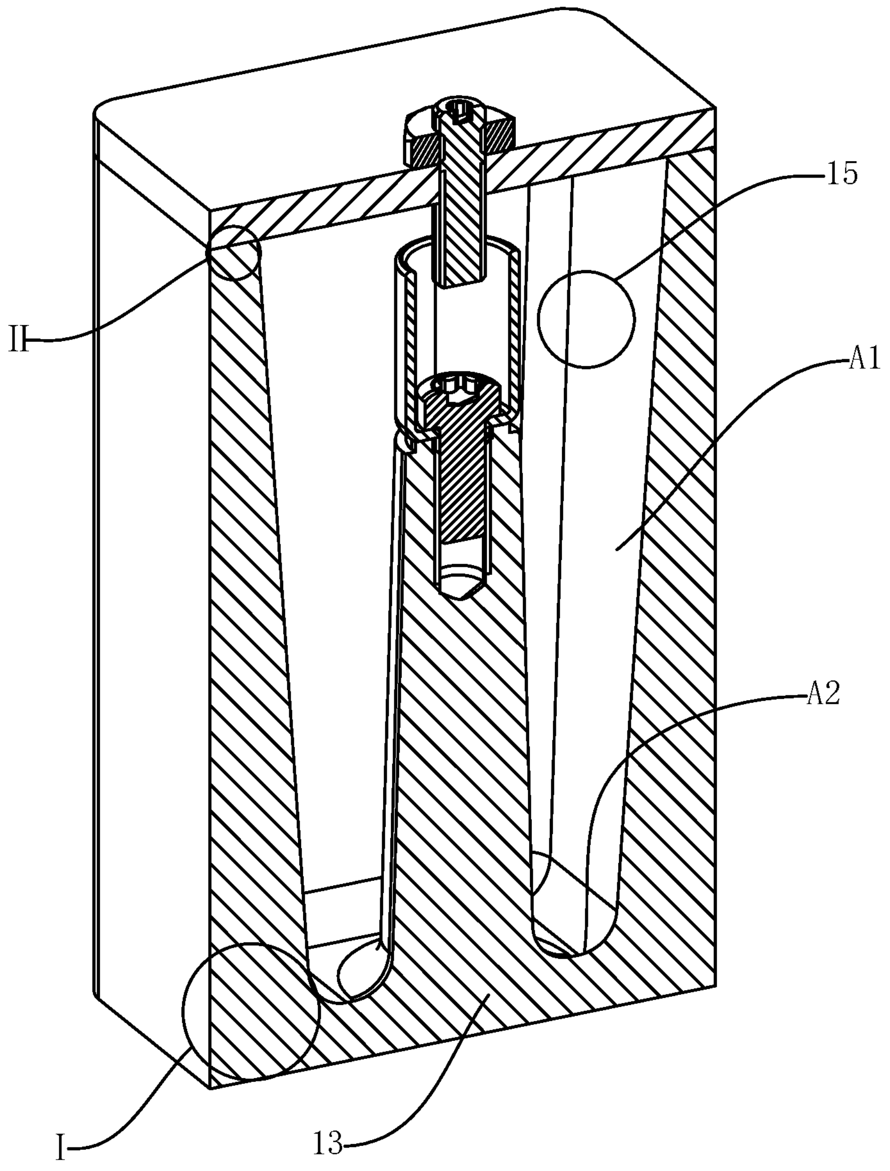
FIG. 1 is a schematic structural diagram of a cavity filter in the prior art.

The present disclosure is described below based on embodiments, but the present disclosure is not only limited to these embodiments. In the following detailed description of the present disclosure, some specific details are described in detail. The present disclosure may be fully understood by those skilled in the art without the description of these detailed parts. In order to avoid confusing the substance of the present disclosure, well-known methods, processes, flows, elements and circuits are not described in detail.

In addition, it should be understood by those of ordinary skill in the art that the drawings provided herein are for illustrative purposes, and the drawings are not necessarily drawn to scale.

Unless the context clearly requires otherwise, similar words such as “including” and “containing” throughout the application document should be interpreted as inclusive rather than exclusive or exhaustive; that is to say, it means “including but not limited to”. Unless otherwise stated, “a plurality of” means two or more.

Unless otherwise specified and limited, the terms “mounted”, “connected”, “connection”, “fixed”, and the like should be understood broadly. For example, the “connection” may be a fixed connection, a detachable connection, or an integrated connection, may be a direct connection or an indirect connection by means of an intermediate medium, or may be an internal connection of two elements or an interaction between two elements. For those of ordinary skill in the art, the specific meanings of the terms in the present disclosure may be understood according to specific situations.

For ease of description, the spatially relative terms such as “in”, “out”, “under”, “below”, “lower”, “above”, “upper”, etc., are used to describe a relationship between one element or feature and another element or feature shown in the figures herein. It would be understood that the spatially relative terms desire to include different orientations in addition to orientations described in the figures when a device is used or operated. For example, if the device in the figures is flipped, it is described that elements “below” or “under” other elements or features are positioned to be “above” other elements or features. Therefore, exemplary terms “below” may include both orientations of “above” and “below”. The device may be oriented in other manners (rotated 90 degree or at other orientations) and the spatially relative descriptors used herein may be interpreted accordingly.

A filter is an electronic device filtering electromagnetic waves, which makes a required signal pass through and suppresses an unwanted signal. In this way, the problem of mutual interference between wireless communication systems at different frequency bands or in different forms is solved.

A cavity filter is widely used in communication systems due to its low pass band insertion loss, high stopband rejection, large toleration to power, convenience in tuning, and other characteristics. A resonant cavity 15 of the cavity filter may be equivalent to a parallel circuit of an inductor and a capacitor, and the resonator 15 forms a resonant stage. In the case that electromagnetic waves at different frequencies oscillate in the resonant cavity 15, the electromagnetic wave at frequency reaching a resonant frequency of the filter may be retained, while the electromagnetic waves at other frequencies may be dissipated. Therefore, a filtering function is achieved. It may be seen therefrom that, in the cavity filter, the resonant frequency is closely related to a size of the resonant cavity, a length of a resonant rod and a distance between the resonant rod and an end cover 14. For example, the longer and the thinner the resonant rod is, the lower the corresponding resonant frequency is.

FIG. 1 is a schematic structural diagram of a cavity filter in the prior art. It may be seen from the drawing, in order to make the cavity filter meet the specific filtering requirement, a height of the cavity filter is configured larger than a width. That is, the resonant cavity 15 is ensured to have a certain height. A draft bevel A1 and an arc-shaped groove A2 are further shown in the drawing. A shell of the cavity filter in the drawing is made by a casting process. In order to facilitate demolding during casting, the draft bevel A1 is arranged on a side wall of the resonant cavity 15, to facilitate successful removal of a mold from a workpiece. The draft bevel A1 extends from a bottom of the resonant cavity 15 all the way to an opening of the resonant cavity 15. In order to make an end face of the opening position have a certain thickness (as shown in a region II), a connecting position of the draft bevel A1 and the bottom shell 13 needs to be configured closer to a central region. It also makes a region I shown in FIG. 1 thicker, and a volume of the resonant cavity smaller; and the arc-shaped groove A2 is formed in the bottom of the resonant cavity 15. On this premise, if the volume of the resonant cavity 15 is expanded after casting by means of machining and other manners, a manufacturing procedure is added; and it is further difficult in a feeding movement of a cutter or a milling cutter if the resonant cavity 15 is deep.

Figure 2:
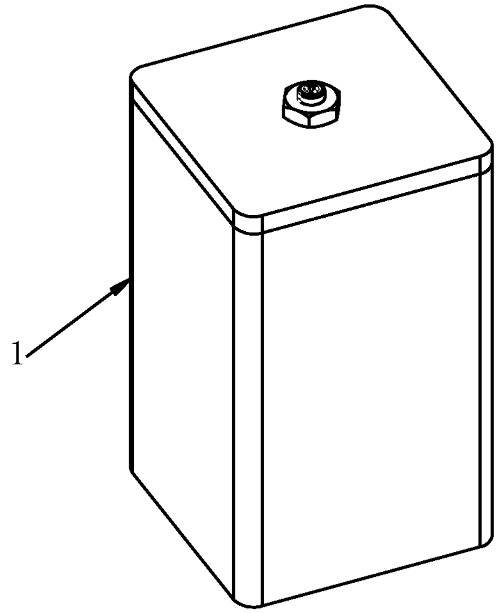
FIG. 2 is an schematic structural diagram of a cavity filter according to an embodiment of the present disclosure.
Figure 3:
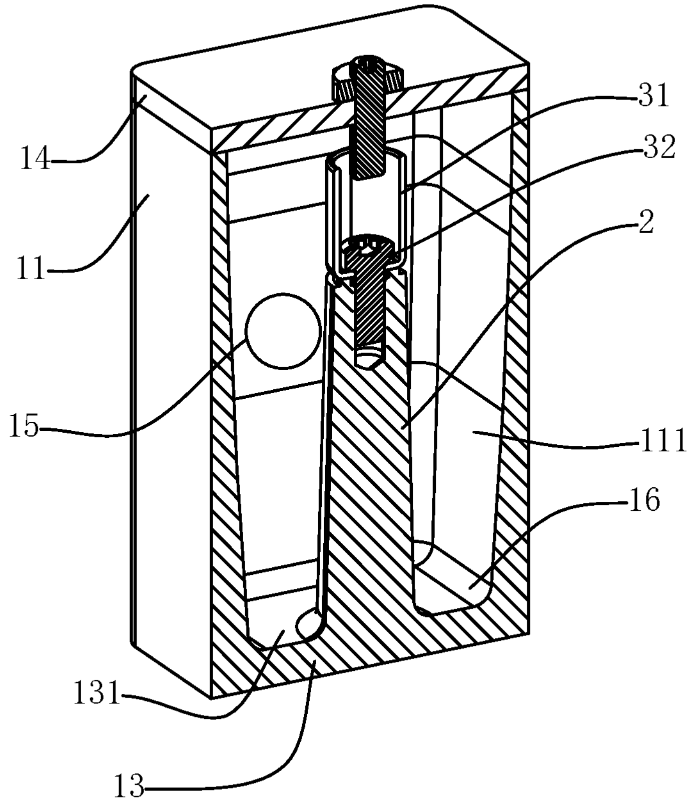
FIG. 3 is an exploded view of a cavity filter according to an embodiment of the present disclosure.
Figure 4:
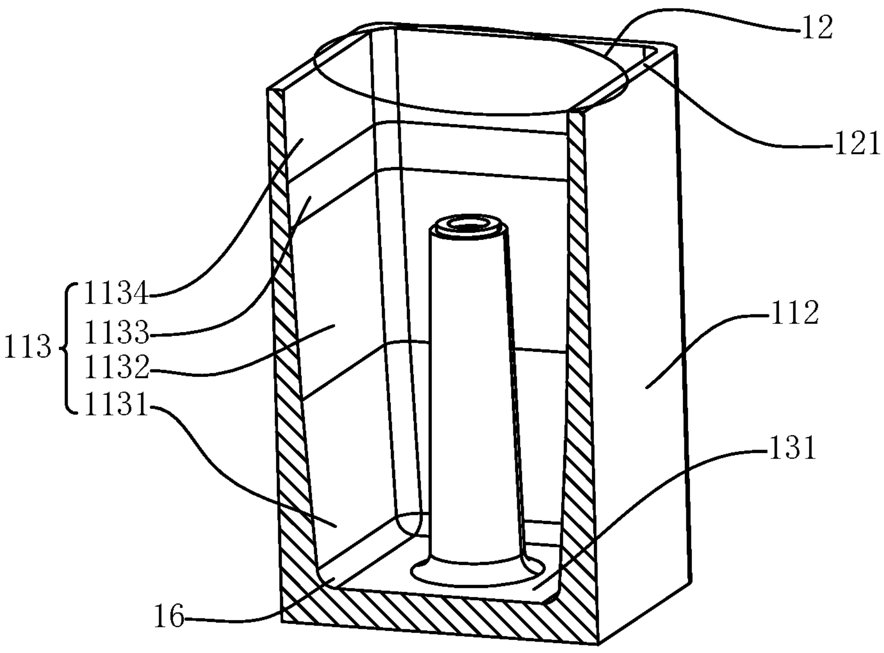
FIG. 4 is a structural schematic diagram of a side shell and a bottom shell according to an embodiment of the present disclosure.
Figure 5:
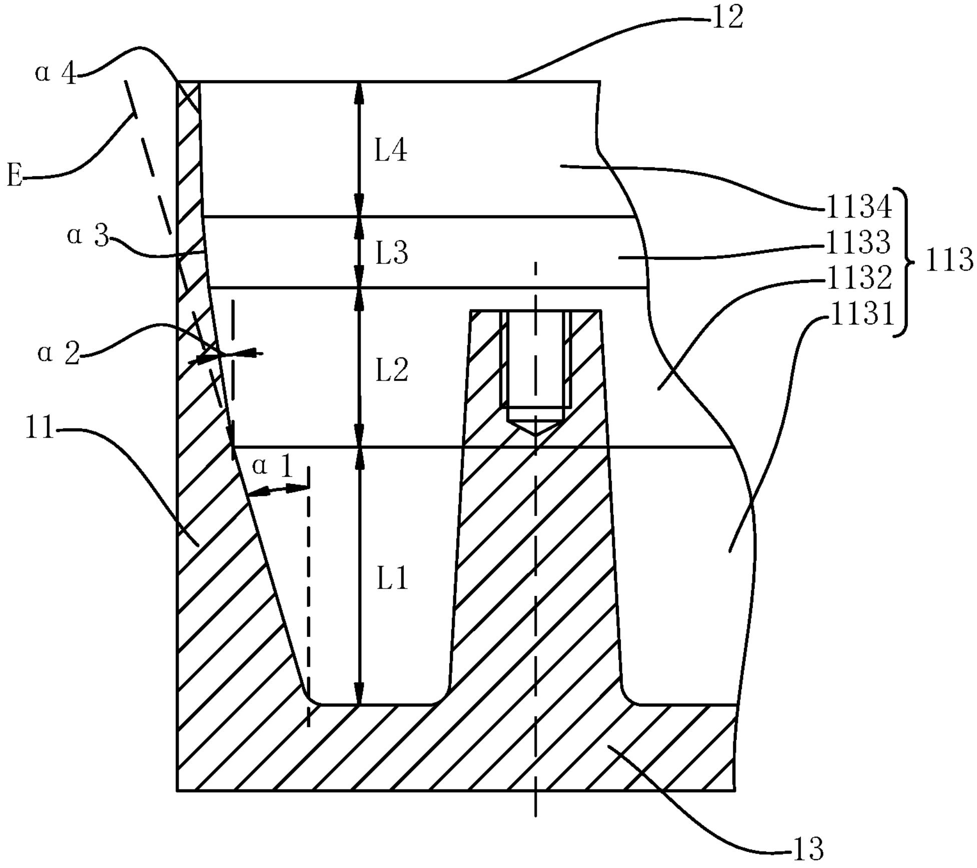
FIG. 5 is a schematic structural diagram of an extension section in some implementations according to an embodiment of the present disclosure.
Figure 6:
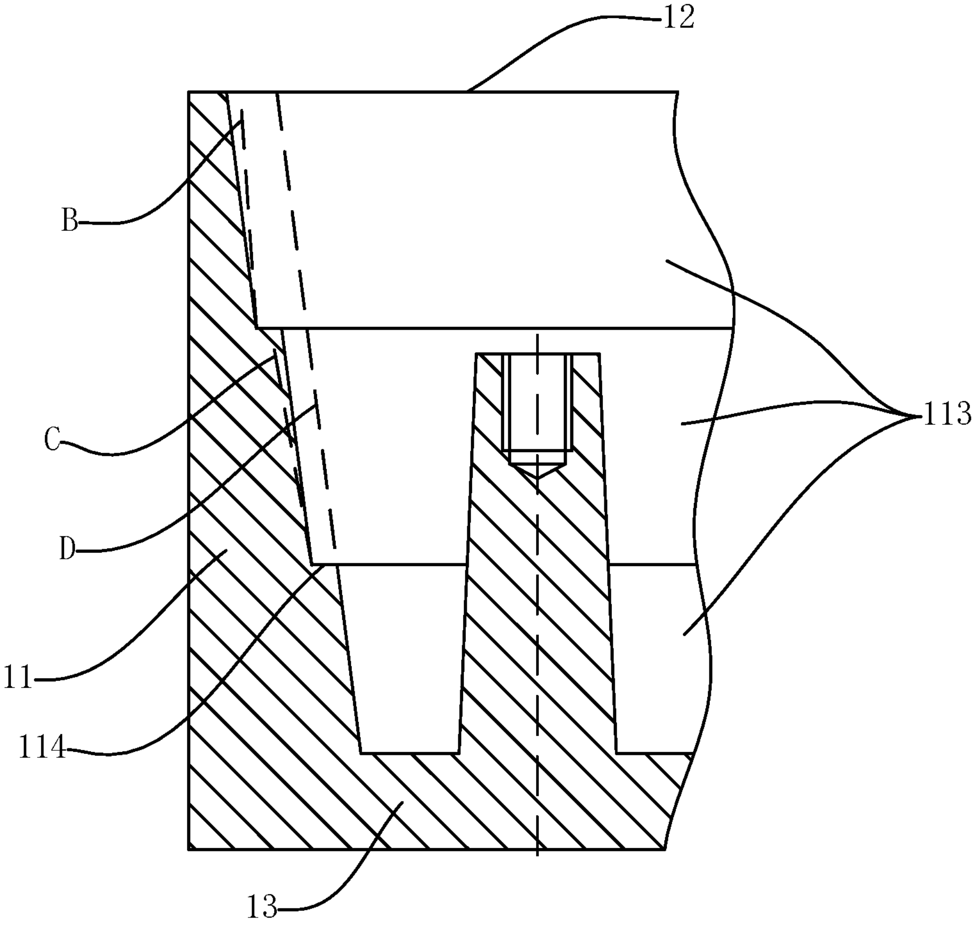
FIG. 6 is a schematic structural diagram of an extension section in other implementations according to an embodiment of the present disclosure.

FIGS. 2-3 are a structural schematic diagram and an exploded view of a cavity filter according to an embodiment of the present disclosure respectively. FIG. 4 is a schematic structure diagram of a side shell 11 and a bottom shell 13. The cavity filter in the drawings is roughly of a cube structure, and an arc transition is provided at an intersection position of lateral surfaces of a cube, for convenience in processing. FIGS. 5-6 are schematic structural diagrams of an extension sections 113 in different implementations according to an embodiment of the present disclosure respectively. Only a part of a region exposed after the cavity filter is cut is shown in the drawings. It may be seen from the two drawings, a plurality of extension sections 113 are arranged starting from the bottom shell 13, so that an inside diameter of the resonant cavity 15 is continuously increased from bottom to top. For convenience in displaying an inclination mode of each extension section 113 in the drawings, the inclination angles are exaggerated.

In some implementations, as shown in FIGS. 2-6, the cavity filter includes a shell portion 1; the shell portion 1 includes a side shell 11, an end cover 14 and a bottom shell 13; the end cover 14 and the bottom shell 13 are arranged oppositely; and the side shell 11 extends from an edge of the bottom shell 13 to an edge of the end cover 14 to form a resonant cavity 15. The resonant cavity 15 is provided with an inner wall 111 arranged on the side shell 11, the side shell 11 is provided with an outer wall 112 away from the inner wall 111, and the inner wall 111 is provided with a plurality of extension sections 113 in an extension direction of the side shell 11. One sides, away from the bottom shell 13, of the plurality of extension sections 113 which are non-coplanar are inclined toward the outer wall 112 on a radial cross section of the shell portion 1.

Specifically, the distance from the extension section 113, close to the bottom shell 13, to a center of the shell portion 1 is smaller than that from the extension section 113, far away from the bottom shell 13, to the center of the shell portion 1.

In this embodiment, the inner wall 111 is divided into the plurality of extension sections 113, and a draft bevel A1 of the resonant cavity 15 is formed by combination of the plurality of extension sections 113; but extension planes where the plurality of extension sections 113 are located are different, i.e., as shown by a dotted line E in FIG. 5. Meanwhile, the extension sections 113 shown in FIGS. 5-6 are also consistent, that is, top positions of the plurality of extension sections 113 are closer to an outer side of the resonant cavity 15 than their bottom positions; and meanwhile, the extension section 113 on the top is closer to the outer side of the resonant cavity 15 than the extension section 113 at the bottom. A dotted line D in FIG. 6 presents an extension direction of the extension section 113 at the bottom, and may extend to an inner side of an annular end surface 121 of an opening end 12. Therefore, compared with the prior art, the cavity filter of this embodiment requires fewer materials and a lighter weight for the shell portion 1 in a case of the same or roughly the same volume of the resonant cavity 15. In other words, in a case of keeping the same or roughly the same volume of the resonant cavity 15 and outer dimension of the cavity filter, the cavity filter of this embodiment may also control an area of the annular end surface 121 of the opening end 12. Therefore, the situation that the annular end surface 121 is too small to be effectively connected with the end cover 14, thereby affecting the electrical performance is avoided.

Optionally, a direction of the side shell 11 around the bottom shell 13 may be circular or rectangular; and those skilled in the art may make a choice according to the actual needs. For example, a plurality of cavity filters in this embodiment form a filter array; and a shape shown in FIG. 2 may be preferentially selected, so as to make full use of a space between the plurality of cavity filters. Meanwhile, a number of extension sections 113 in this embodiment may further be selected according to a height requirement of the cavity filter, including, but not limited to, 2, 3, 4, 5 or the like. The plurality of extension sections 113 on the inner wall 111 may be distributed extending from the bottom shell 13 to the opening end 12, or only be distributed in a partial region of the inner wall 111. A material of the shell portion 1 includes, but is not limited to, copper, aluminum, silver or the like.

To sum up, for the cavity filter of the embodiments of the present disclosure, the inner wall 111 of the resonant cavity 15 is provided with the plurality of non-coplanar extension sections 113 inclined toward the outer wall 112; and meanwhile, each extension section 113 gradually extends toward the end cover 14 from the bottom shell 13. Thus, a volume of the resonant cavity 15 is increased, making an insertion loss smaller; an outer dimension of the cavity filter is further reduced, making an overall weight lighter; and meanwhile, during casting of the shell portion 1 of the cavity filter, the difficulty of demolding is reduced.

Specifically, the plurality of extension sections 113 in this embodiment may be arranged in different ways. For example, an arrangement way shown in FIG. 5, where two adjacent extension sections 113 are connected end to end, and inclination angles of the plurality of extension sections 113 are different. For another example, an arrangement way shown by a solid line in FIG. 6, where inclination directions of the extension sections 113 shown by the solid line is the same. In this form, two adjacent extension sections 113 are connected by a connecting section 114. That is, the inner wall 111 is formed by the plurality of extension sections 113 and at least one connecting section 114. An extension direction of the connecting section 114 is perpendicular to or roughly perpendicular to the extension direction of the side shell 11. For another example, an arrangement way shown by a dotted line B and a dotted line C in FIG. 6, where inclination angles of the two dotted lines are different, where the inclination angle of the extension section 113 shown by the dotted line B on the top is smaller than that of the solid line; and the inclination angle of the extension section 113 shown by the dotted line C in the middle is larger than that of the solid line.

In some implementations, as shown in FIGS. 2-6, the cavity filter includes a mounting boss 2, protruding from the bottom shell 13 and having a mesa spaced from the end cover 14 by a predetermined distance. The mounting boss 2 of this embodiment is configured for mounting a resonator 31. For this reason, a height of the mounting boss 2 is controlled, so as to ensure there is a certain interval between a top of the resonator 31 and the end cover 14.

In some implementations, as shown in FIGS. 2-6, a plurality of mounting bosses 2 are provided, and arranged surrounding a center of the bottom shell 13 and centers of the plurality of extension sections 113 at the same time. Therefore, a plurality of resonators 31 may be arranged on the plurality of mounting bosses 2 respectively, so as to collaboratively operate.

In other implementations, as shown in FIGS. 2-6, one mounting boss 2 is provided, protruding from the center of the bottom shell 13, and corresponding to the centers of the plurality of extension sections 113. In this embodiment, each extension section 113 is arranged around a circumferential direction of the mounting boss 2, so that the resonant cavity 15 is ensured to uniformly reflect electromagnetic waves in all directions, so as to improve the filtering performance of the cavity filter.

Specifically, a threaded hole is formed in the mesa of the mounting boss 2; the cavity filter further includes the resonator 31 and a connecting bolt 32 corresponding to the threaded hole; and the resonator 31 is mounted on the mounting boss 2 through the connecting bolt 32.

Further, the bottom shell 13 has an annular plane 131, which is located between the side shell 11 and the mounting boss 2. In this embodiment, the side shell 11 becomes thinner by virtue of the plurality of extension sections 113, so that the annular plane 131 is formed between the mounting boss 2 and the side shell 11. Compared with an arc-shaped groove A2 in FIG. 1, in this embodiment, the annular plane 131 on the bottom shell 13 is more convenient for demolding, thereby improving the production efficiency of a product.

It is easy to understand that there are two ways to transmit electromagnetic energy or electromagnetic signals, where one is propagation of an electromagnetic wave in a space or atmosphere; and the other is propagation of an electromagnetic wave along a waveguide system. The resonator 31 of the cavity filter focuses on magnetic coupling, and an open circuit is formed between the resonator 31 and the end cover 14, i.e., an equivalent capacitance. In contrast, distribution of electric and magnetic fields is the strongest on the resonant cavity 15 at the positions of the end cover 14 and the bottom shell 13. Therefore, in this embodiment, by arranging one annular plane 131 on a bottom surface opposite to the end cover 14, the filtering performance of the cavity filter may be improved.

In some implementations, as shown in FIGS. 2-6, the inclination angle of each extension section 113 is larger than 0 degree and smaller than 5 degrees.

It is easy to understand that in the casting process, in order to conveniently remove a workpiece from a mold, the draft bevel A1 is usually arranged on the side wall. In this embodiment, the inclination angles of the plurality of extension sections 113 are controlled within a certain range, so as to achieve the effect of convenience in demolding.

In some implementations, as shown in FIGS. 2-6, the plurality of extension sections 113 include a first extension section 1131, a second extension section 1132, a third extension section 1133, and a fourth extension section 1134 which are connected with each other sequentially; the first extension section 1131 is adjacent to the bottom shell 13; and the fourth extension section 1134 is adjacent to the end cover 14. In this embodiment, the position of the resonant cavity 15 on the side shell 11 is formed by connecting the first extension section 1131, the second extension section 1132, the third extension section 1133, and the fourth extension section 1134.

Further, the inclination angles of the first extension section 1131, the second extension section 1132, the third extension section 1133, and the fourth extension section 1134 are sequentially reduced, that is, $\alpha 1$, $\alpha 2$, $\alpha 3$ and $\alpha 4$ shown in FIG. 5 respectively.

It is easy to understand that a region, at the bottom of the side wall, of the resonant cavity 15 is more difficult in demolding than a region on a top of the resonant cavity 15. In this embodiment, in order to avoid the above situation, the inclination angle of the first extension section 1131 is configured larger, so as to achieve easy demolding at the bottom. On this premise, considering that the electrical performance of the resonant cavity 15 and the area of the annular end surface 121 should not be too small, the inclination angle of the extension section 113 close to the opening end 12 is reduced. Therefore, on the premise of ensuring a yield of the whole cavity filter during demolding, it may further ensure that the area of the annular end surface 121 and a thickness of the fourth extension section 1134 are not too small, which affects the electrical performance of the shell portion 1.

In some implementations, as shown in FIGS. 2-6, the inclination angle of the first extension section 1131 is larger than 3.5 degrees and smaller than or equal to 5 degrees; the inclination angle of the second extension section 1132 is larger than 2 degrees and smaller than or equal to 3.5 degrees; the inclination angle of the third extension section 1133 is larger than 1.2 degrees and smaller than or equal to 2 degrees; and the inclination angle of the fourth extension section 1134 is larger than 0 degree and smaller than or equal to 1.2 degrees. In this embodiment, the inclination angles of the first extension section 1131, the second extension section 1132, the third extension section 1133, and the fourth extension section 1134 are distributed between 0 degree and 5 degrees, so that each extension section 113 may be arranged according to the respective inclination angle. It ensures the requirements of the plurality of extension sections 113 for draft angles, may further reduce the draft angles sequentially.

Specifically, $\alpha 1$, $\alpha 2$, $\alpha 3$ and $\alpha 4$ are 4 degrees, 2.5 degrees, 1.5 degrees and 1 degree respectively.

In some implementations, as shown in FIGS. 2-6, lengths of the first extension section 1131, the second extension section 1132 and the third extension section 1133 in the extension direction of the side shell 11 are a first section length, a second section length and a third section length respectively. The first section length, the second section length and the third section length are configured to be positively correlated with the inclination angles of the corresponding extension sections 113. That is, the larger the inclination angle is, the longer the corresponding section length is.

FIG. 5 shows the first section length, the second section length, the third section length and the fourth section length, i.e., L1, L2, L3 and L4. In the drawing, the length L1 is the longest, and the inclination angle of the corresponding first extension section 1131 is also the largest. During demoulding, this inclination angle ensures that the workpiece and the mold may be easily separated. Therefore, the first extension section 1131 is configured to be the largest in a size in a height direction, so that its corresponding area is also the largest. In contrast, the inclination angle of the third extension section 1133 is the smallest compared with the second extension section 1132 and the first extension section 1131, because the third extension section 1133 is slightly difficult in demolding than the above two. For this reason, a corresponding area of the third extension section 1133 is configured to be the smallest, so as to reduce the demolding difficulty. Therefore, in this embodiment, the areas occupied by the plurality of extension sections 113 are configured according to the demolding difficulties of the plurality of extension sections 113, so that the demolding difficulty of the whole resonant cavity 15 is reduced.

In contrast, the fourth section length of the fourth extension section 1134 is configured to be independent of the inclination angle of the fourth extension section 1134, allowing the fourth extension section 1134 to connect between the third extension section 1133 and the opening end 12. For example, the fourth section length is configured larger than the third section length. The fourth extension section 1134 is located at the opening end 12. During demolding, the side shell 11 at the fourth extension section 1134 may be preferentially demolded using a demolding tool or other manners. Therefore, given a certain area of the inner wall 111, a number of the arranged extension sections 113 is reduced, so as to reduce the production cost of the mold. For example, during demolding, the annular end surface 121 is knocked using a wood hammer or a rubber hammer, and vibration generated by knocking may preferentially make the fourth extension section 1134 be demolded. However, vibration is relatively weakened when being sequentially transmitted to the positions of the third extension section 1133, the second extension section 1132 and the first extension section 1131; but it may still ensure smooth demolding of a bottom region of the side shell 11 through specific configuration of the first section length, the second section length and the third section length.

In some implementations, as shown in FIGS. 2-6, the shell portion 1 further includes a fillet 16; and the fillet 16 faces the resonant cavity 15 and is located at a connecting position of the side shell 11 and the bottom shell 13.

In other words, the plurality of extension sections 113 in the above embodiments form the inner wall 111 with the fillet 16 in this embodiment together.

Optionally, the fillet 16 is further arranged at a connecting position of the mounting boss 2 and the bottom shell 13. The demolding difficulty of the resonant cavity 15 may be effectively reduced through transition with the fillet 16.

In one optional implementation, the cavity filter in the above embodiments may be applied to a communication device. The communication device includes, but is not limited to, a duplexer, a combiner, or a tower amplifier (TA).

For the communication device of the embodiments of the present disclosure, the inner wall 111 of the resonant cavity 15 of the cavity filter is provided with the plurality of non-coplanar extension sections 113 inclined toward the outer wall 112; and meanwhile, each extension section 113 gradually extends toward the end cover 14 from the bottom shell 13. Thus, a volume of the resonant cavity 15 is increased, making an insertion loss smaller and signal interference be weakened. an outer dimension of the cavity filter is further reduced, making an overall weight lighter; and meanwhile, during casting of the shell portion 1 of the cavity filter, the difficulty of demolding is reduced.

The above description is only the preferred embodiment of the present disclosure and is not intended to limit the present disclosure, and various alterations and changes may be made in the present disclosure for those skilled in the art. Any modification, equivalent replacement, improvement, and the like made within the spirit and principle of the present disclosure should fall within the protection scope of the present disclosure.

We claim:

1. A cavity filter, comprising:

a shell portion, comprising a side shell, an end cover and a bottom shell, wherein the end cover and the bottom shell are arranged oppositely, and the side shell extends from the bottom shell to the end cover to form a resonant cavity;

the resonant cavity is provided with an inner wall arranged on the side shell, the side shell is provided with an outer wall away from the inner wall, and the inner wall is provided with a plurality of extension sections in an extension direction of the side shell; and one sides, away from the bottom shell, of the plurality of extension sections which are non-coplanar are inclined toward the outer wall on a radial cross section of the shell portion, wherein inclination angles of the plurality of extension sections are different.

2. The cavity filter according to claim 1, further comprising:

a mounting boss, protruding from the bottom shell and having a mesa spaced from the end cover by a predetermined distance.

3. The cavity filter according to claim 2, wherein the bottom shell has an annular plane, and the annular plane is located between the side shell and the mounting boss.

4. The cavity filter according to claim 1, wherein an inclination angle of each extension section is larger than 0 degree and smaller than 5 degrees.

5. The cavity filter according to claim 1, wherein the plurality of extension sections comprise a first extension section, a second extension section, a third extension section and a fourth extension section which are connected with each other sequentially; the first extension section is adjacent to the bottom shell; and the fourth extension section is adjacent to the end cover.

6. The cavity filter according to claim 5, wherein the inclination angles of the first extension section, the second extension section, the third extension section, and the fourth extension section are sequentially reduced.

7. The cavity filter according to claim 5, wherein the inclination angle of the first extension section is larger than 3.5 degrees and smaller than or equal to 5 degrees; the inclination angle of the second extension section is larger than 2 degrees and smaller than or equal to 3.5 degrees; the inclination angle of the third extension section is larger than 1.2 degrees and smaller than or equal to 2 degrees; and the inclination angle of the fourth extension section is larger than 0 degree and smaller than or equal to 1.2 degrees.

8. The cavity filter according to claim 5, wherein lengths of the first extension section, the second extension section and the third extension section in the extension direction of the side shell are a first section length, a second section length and a third section length respectively; and the first section length, the second section length and the third section length are configured to be positively correlated with the inclination angles of the corresponding extension sections.

9. The cavity filter according to claim 1, wherein the shell portion further comprises a fillet; and the fillet faces the resonant cavity and is located at a connecting position of the side shell and the bottom shell.

10. The cavity filter according to claim 1, wherein a distance from the extension section of the plurality of extension sections, close to the bottom shell, to a center of the shell portion is less than that from the extension section of the plurality of extension sections, far away from the bottom shell, to the center of the shell portion.

* * * * *